United States Patent
Kulik et al.

(10) Patent No.: US 10,862,632 B2
(45) Date of Patent: Dec. 8, 2020

(54) SYSTEMS AND METHODS FOR REDUCING REDUNDANT JITTER CLEANERS IN WIRELESS DISTRIBUTION SYSTEMS

(71) Applicant: Corning Optical Communications LLC, Hickory, NC (US)

(72) Inventors: Shlomi Kulik, Petah Tikva (IL); Guy Lupescu, Tel Aviv (IL)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/264,240

(22) Filed: Jan. 31, 2019

(65) Prior Publication Data

US 2020/0106570 A1    Apr. 2, 2020

Related U.S. Application Data

(60) Provisional application No. 62/739,407, filed on Oct. 1, 2018.

(51) Int. Cl.
*H04J 14/02* (2006.01)
*H04L 1/20* (2006.01)
*H04L 25/02* (2006.01)
*H04J 3/06* (2006.01)

(52) U.S. Cl.
CPC ............ *H04L 1/205* (2013.01); *H04J 3/0635* (2013.01); *H04L 25/02* (2013.01)

(58) Field of Classification Search
CPC ......... H04L 1/205; H04L 25/02; H04J 3/0635
See application file for complete search history.

(56) References Cited

U.S. PATENT DOCUMENTS

| | | | |
|---|---|---|---|
| 9,742,549 B1* | 8/2017 | Wang | H04J 3/0647 |
| 2004/0203703 A1* | 10/2004 | Fischer | H04W 88/085 |
| | | | 455/422.1 |
| 2007/0057697 A1* | 3/2007 | Boerstler | G01R 31/31725 |
| | | | 327/34 |
| 2011/0299641 A1* | 12/2011 | Barkan | H04J 3/0685 |
| | | | 375/356 |
| 2017/0026857 A1* | 1/2017 | Kummetz | H04W 24/02 |
| 2019/0319736 A1* | 10/2019 | Hanson | H04B 10/27 |

* cited by examiner

*Primary Examiner* — Sithu Ko
*Assistant Examiner* — Malick A Sohrab
(74) *Attorney, Agent, or Firm* — C. Keith Montgomery

(57) ABSTRACT

A digital routing unit (DRU) within a wireless distribution system (WDS) couples to multiple signal sources (e.g., base band units (BBU)) through common public radio interface (CPRI) links in such a fashion that clock reconditioning circuitry within the DRU is consolidated. That is, instead of each receiver circuit at each input at the DRU having its own clock reconditioning circuit, signals from the same network operator may be multiplexed so as to select a single signal and, from that single signal, recover a cleaned clock signal for use by all the receivers that receive signals from that network operator.

14 Claims, 9 Drawing Sheets

SYSTEMS AND METHODS FOR REDUCING REDUNDANT JITTER CLEANERS IN WIRELESS DISTRIBUTION SYSTEMS

CROSS-REFERENCE TO RELATED APPLICATIONS

The application claims priority under 35 U.S.C. § 119 of U.S. Provisional Patent Application Ser. No. 62/739,407, filed on Oct. 1, 2018, the content of which is incorporated herein by reference in its entirety.

BACKGROUND

The disclosure relates generally to communication systems and, more particularly, to communication systems that provide wireless service to user equipment for multiple service operators and still more particularly to managing clock signals from the multiple service operators.

Wireless customers are increasingly demanding wireless communication services, such as cellular communication services and Wireless Fidelity (Wi-Fi) services. Thus, small cells, and more recently Wi-Fi services, are being deployed indoors. At the same time, some wireless customers use their wireless communication devices in areas that are poorly serviced by conventional cellular networks, such as inside certain buildings or areas where there is little cellular coverage. One response to the intersection of these two concerns has been the use of wireless distribution systems (WDSs). Examples of WDSs include distributed antenna systems (DASs), remote radio head (RRH) systems, and small radio cell systems (e.g., femtocells systems). WDSs include remote units configured to receive and transmit downlink communication signals to client devices within the antenna range of the respective remote units. WDSs can be particularly useful when deployed inside buildings or other indoor environments where the wireless communication devices may not otherwise be able to effectively receive radio frequency (RF) signals from a source.

In this regard, FIG. 1 illustrates distribution of communication services to remote coverage areas 100(1)-100(N) of a WDS 102, wherein 'N' is the number of remote coverage areas. These communication services can include cellular services, wireless services, such as RF identification (RFID) tracking, Wi-Fi, local area network (LAN), and wireless LAN (WLAN), wireless solutions (Bluetooth, Wi-Fi Global Positioning System (GPS) signal-based, and others) for location-based services, and combinations thereof, as examples. The variety of services may dictate that each service have its own transceiver with accompanying phase-locked loop (PLL). The remote coverage areas 100(1)-100(N) may be remotely located. In this regard, the remote coverage areas 100(1)-100(N) are created by and centered on remote units 104(1)-104(N) connected to a central unit 106 (e.g., a digital routing unit (DRU) a head-end controller, a head-end unit (HEU), or the like). Each such remote unit 104(1)-104(N) may include one or more PLLs. The central unit 106 may be communicatively coupled to a signal source 108, for example, a base transceiver station (BTS) or a baseband unit (BBU). When the signal source 108 is a BBU, the signal source 108 may communicate with the central unit 106, which may be a DRU, using digital communication protocols such as the common public radio interface (CPRI). In this regard, the central unit 106 receives downlink communication signals 110D from the signal source 108 to be distributed to the remote units 104(1)-104(N). The remote units 104(1)-104(N) are configured to receive the downlink communication signals 110D from the central unit 106 over a communication medium 112 to be distributed to the respective remote coverage areas 100(1)-100(N) of the remote units 104(1)-104(N). In a non-limiting example, the communication medium 112 may be a wired communication medium, a wireless communication medium, or an optical fiber-based communication medium. Each of the remote units 104(1)-104(N) may include an RF transmitter/receiver (not shown) and a respective antenna 114(1)-114(N) operably connected to the RF transmitter/receiver to wirelessly distribute the communication services to client devices 116 within the respective remote coverage areas 100(1)-100(N). The remote units 104(1)-104(N) are also configured to receive uplink communication signals 110U from the client devices 116 in the respective remote coverage areas 100(1)-100(N) to be distributed to the signal source 108. The size of each of the remote coverage areas 100(1)-100(N) is determined by an amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

With reference to FIG. 1, the central unit 106 includes electronic processing devices, for example a field-programmable gate array (FPGA), a digital signal processor (DSP), and/or a central processing unit (CPU), for processing the downlink communication signals 110D and the uplink communication signals 110U. Likewise, each of the remote units 104(1)-104(N) also employs electronic processing devices for processing the downlink communication signals 110D and the uplink communication signals 110U. Further, the communication medium 112 is only able to carry the downlink communication signals 110D and the uplink communication signals 110U up to a maximum bandwidth. Collectively, the processing capabilities of the electronic processing devices in the central unit 106, the processing capabilities of the electronic processing devices in the remote units 104(1)-104(N), and the maximum bandwidth of the communication medium 112 provide the system resources available in the WDS 102.

When there is only one signal source 108, communication between the signal source 108 and the central unit 106 is relatively simple. However, the central unit 106 may include multiple inputs (e.g., 36), each of which may be coupled to a signal source 108. It should be further appreciated that multiple signal sources 108, each corresponding to a different network operator (e.g., AT&T, SPRINT, VERIZON, etc.), may be coupled to the central unit 106 using different ones of the multiple inputs.

No admission is made that any reference cited herein constitutes prior art. Applicant expressly reserves the right to challenge the accuracy and pertinency of any cited documents.

SUMMARY

In one exemplary aspect, a central unit in a wireless distribution system (WDS) is disclosed. The central unit includes a plurality of inputs including a first subset of inputs configured to be coupled to a first signal source using a common public radio interface (CPRI) protocol. The central unit also includes a first multiplexer coupled to the plurality of inputs. The first multiplexer is configured to receive first jittery clock signals from each of the first subset of inputs.

The first multiplexer is also configured to select a first one of the first jittery clock signals. The first multiplexer is also configured to output the first one of the first jittery clock signals. The central unit also includes a first jitter cleaner circuit coupled to the first multiplexer. The first jitter cleaner circuit is configured to receive the first one of the first jittery clock signals. The first jitter cleaner circuit is also configured to produce a first cleaned clock signal.

An additional embodiment of the disclosure relates to a WDS. The WDS includes a plurality of remote units. The WDS also includes a central unit. The central unit is coupled to the plurality of remote units via a plurality of communication media, respectively. The central unit includes a plurality of inputs including a first subset of inputs configured to be coupled to a first signal source using a CPRI protocol. The central unit also includes a first multiplexer coupled to the plurality of inputs. The first multiplexer is configured to receive first jittery clock signals from each of the first subset of inputs. The first multiplexer is also configured to select a first one of the first jittery clock signals. The first multiplexer is also configured to output the first one of the first jittery clock signals. The central unit also includes a first jitter cleaner circuit coupled to the first multiplexer. The first jitter cleaner circuit is configured to receive the first one of the first jittery clock signals. The first jitter cleaner circuit is also configured to produce a first cleaned clock signal. The central unit is configured to distribute a plurality of downlink communication signals to the plurality of remote units via the plurality of communication media, respectively. The central unit is also configured to receive a plurality of uplink communication signals from the plurality of remote units via the plurality of communication media, respectively. The central unit is also configured to generate a plurality of communication signals based on the plurality of uplink communication signals. Each of the plurality of communication signals corresponds to a signal channel and a remote unit among the plurality of remote units communicating on the signal channel. The WDS also includes a signal processing circuit including a signal input communicatively coupled to a plurality of signal sources, respectively.

An additional embodiment relates to a method for managing clock signals in a central unit. The method includes receiving a plurality of CPRI protocol signals at a first subset of inputs among a plurality of inputs at the central unit. The method also includes passing jittery clock signals from the first subset of inputs to a first multiplexer. The method also includes selecting one of the jittery clock signals at the first multiplexer. The method also includes cleaning the selected one of the jittery clock signals with a jitter cleaner circuit to produce a cleaned clock signal.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Exemplary aspects of the present disclosure allow a central unit such as a digital routing unit (DRU) within a wireless distribution system (WDS) to couple to multiple signal sources (e.g., base band units (BBUs)) through common public radio interface (CPRI) links in such a fashion that clock reconditioning circuitry within the DRU is consolidated. That is, instead of each receiver circuit at each input at the DRU having its own clock reconditioning circuit, signals from the same network operator may be multiplexed so as to select a single signal and, from that single signal, recover a cleaned clock signal for use by all the receivers that receive signals from that network operator. Before addressing the particulars of the present disclosure, a brief overview of a WDS having multiple signal sources is provided with reference to FIG. 2. Further, the conventional approach to recovering clocks is discussed below with respect to FIGS. 3 and 4. Discussion of the consolidated approach of the present disclosure begins below with reference to FIG. 5.

Figure 1:
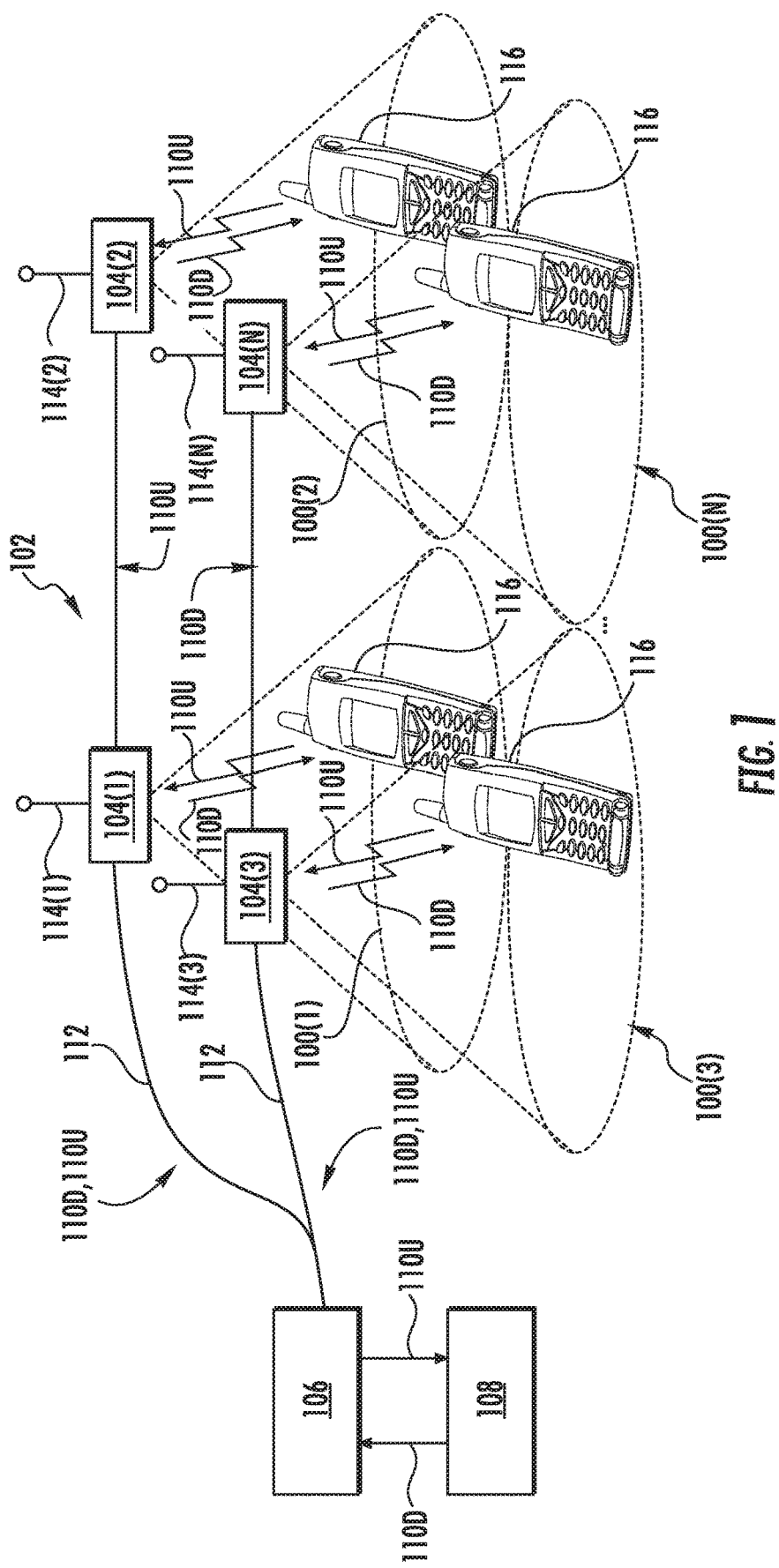
FIG. 1 illustrates distribution of communication services to remote coverage areas of a wireless distribution system (WDS)
Figure 2:
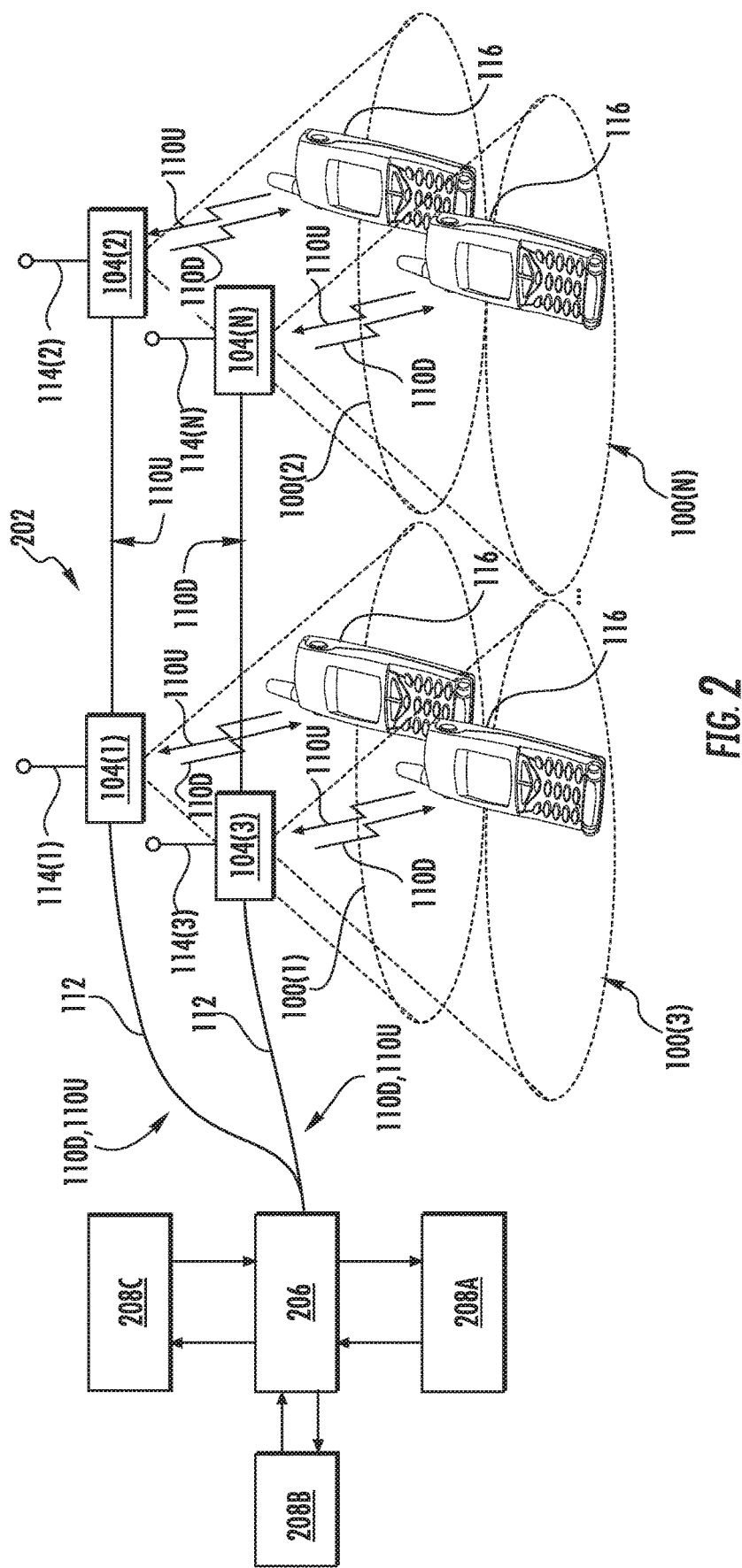
FIG. 2 illustrates a WDS having multiple signal sources coupled to a central unit.

In this regard, FIG. 2 illustrates distribution of communication services to remote coverage areas 100(1)-100(N) of a WDS 202, wherein 'N' is the number of remote coverage areas. The WDS 202 is substantially similar to the WDS 102 of FIG. 1, and the following discussion parallels the discussion of the WDS 102 noting the changes at a central unit 206 and the plural signal sources 208A-208C. The communication services distributed by the WDS 202 can include cellular services, wireless services, such as radio frequency (RF) identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The variety of services may dictate that each service have its own transceiver with accompanying phase-locked loop (PLL). The remote coverage areas 100(1)-100(N) may be remotely located. In this regard, the remote coverage areas 100(1)-100(N) are created by and centered on remote units 104(1)-104(N) connected to a central unit 206 (e.g., a DRU a head-end controller, a head-end unit (HEU), or the like). The central unit 206 may be communicatively coupled to a plurality of signal sources 208A-208C, each of which may be, for example, a base transceiver station (BTS) or a BBU. The signal sources 208A-208C may communicate with the central unit 206, which may be a DRU, using digital communication protocols such as the CPRI. In this regard, the central unit 206 receives downlink communication signals from the signal sources 208A-208C to be distributed to the remote units 104(1)-104(N). The remote units 104(1)-104(N) are configured to receive downlink communication signals 110D from the central unit 206 over a communication medium 112 to be distributed to the respective remote coverage areas 100(1)-100(N) of the remote units 104(1)-104(N). In a non-limiting example, the communication medium 112 may be a wired communication medium, a wireless communication medium, or an optical fiber-based communication medium. Each of the remote units 104(1)-104(N) may include an RF transmitter/receiver (not shown) and a respective antenna 114(1)-114(N) operably connected to the RF transmitter/receiver to wirelessly distribute the communication services to client devices 116 within the respective remote coverage areas 100(1)-100(N). The remote units 104(1)-104(N) are also configured to receive uplink communication signals 110U from the client devices 116 in the respective remote coverage areas 100(1)-100(N) to be distributed to the signal sources 208A-208C. The size of each of the remote coverage areas 100(1)-100(N) is determined by an amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

With reference to FIG. 2, the central unit 206 includes electronic processing devices, for example a field-programmable gate array (FPGA), a digital signal processor (DSP), and/or a central processing unit (CPU), for processing the downlink communication signals 110D and the uplink communication signals 110U. Likewise, each of the remote units 104(1)-104(N) also employs electronic processing devices for processing the downlink communication signals 110D and the uplink communication signals 110U. Further, the communication medium 112 is only able to carry the downlink communication signals 110D and the uplink communication signals 110U up to a maximum bandwidth. Collectively, the processing capabilities of the electronic processing devices in the central unit 206, the processing capabilities of the electronic processing devices in the remote units 104(1)-104(N), and the maximum bandwidth of the communication medium 112 provide the system resources available in the WDS 202.

Figure 3:
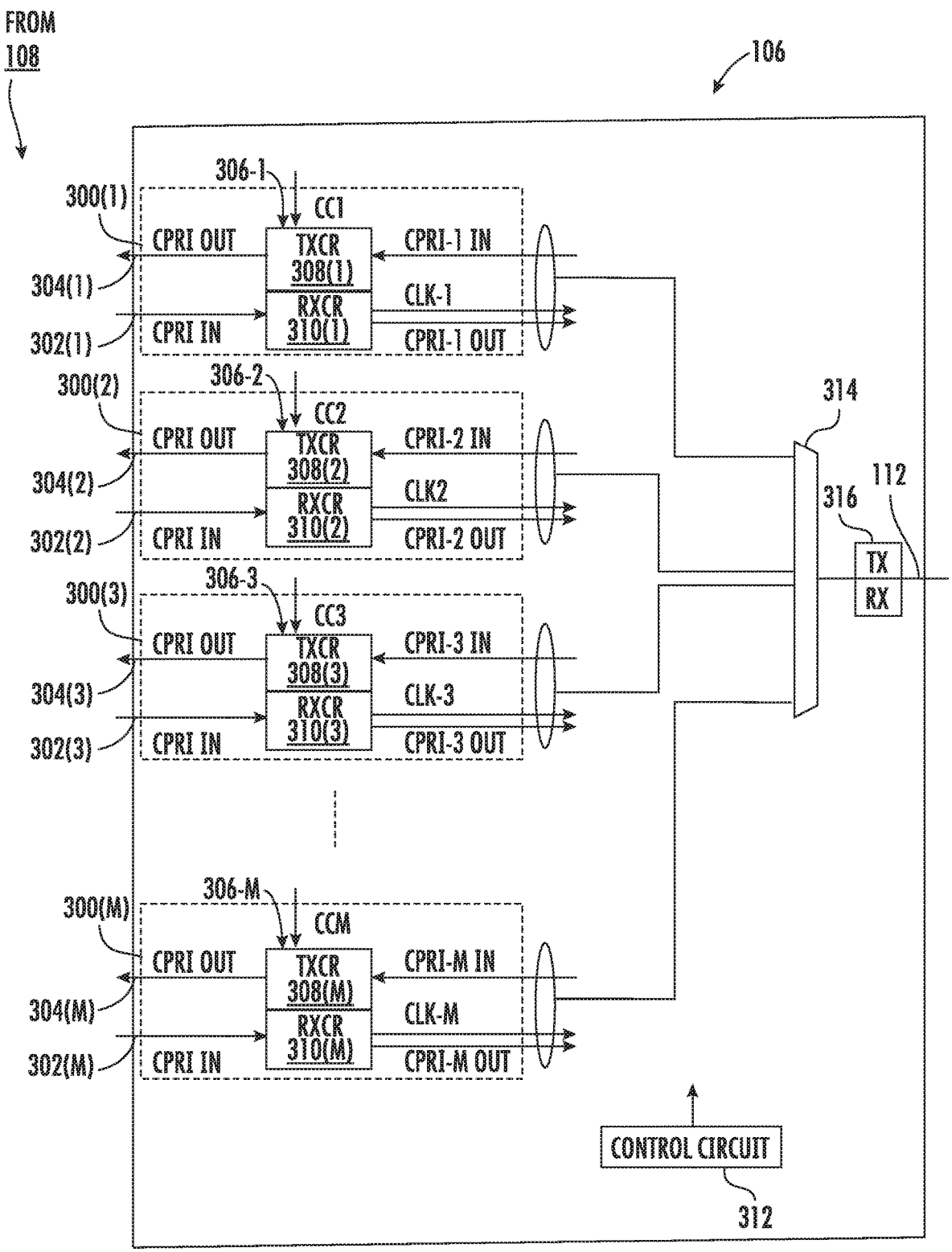
FIG. 3 illustrates a simplified block diagram of a conventional central unit which may be a digital routing unit (DRU) coupled to multiple signal sources.

In a conventional system, such as the WDS 102 of FIG. 1, each incoming CPRI signal to the central unit 106 may have a clock signal. In cases where there are multiple signals provided by a single network operator, these clock signals may be duplicative. Nevertheless, the clock signals are passed through the central unit 106 to the remote units 104(1)-104(N). FIG. 3 illustrates details of the conventional central unit 106 coupled to multiple signal sources 108.

In this regard, the central unit 106, which may be a DRU, has M inputs 300(1)-300(M). While generically referred to as inputs, it should be appreciated that in an exemplary aspect, these inputs are CPRI ports, each having a respective CPRI in line 302(1)-302(M) and a respective CPRI out line 304(1)-304(M). Each input 300(1)-300(M) has a respective transceiver 306(1)-306(M), having a respective transmitter (TXCR) 308(1)-308(M) and a respective receiver (RXCR) 310(1)-310(M). A control circuit 312 may control a multiplexer 314 and perform other control functions within the central unit 106. The transceivers 306(1)-306(M) send and receive signals through the multiplexer 314 to a transceiver 316 that is coupled to the communication medium 112. The signals from the transceivers 306(1)-306(M) may include respective clock signals CLK1-CLKM that are extracted from the incoming signal on the respective CPRI in line 302(1)-302(M). In many instances the incoming signal is jittery, and the extracted clock signal may be refreshed through an associated jitter cleaner to provide cleaned clock signals CC1-CCM back to the transceivers 306(1)-306(M).

Figure 4:
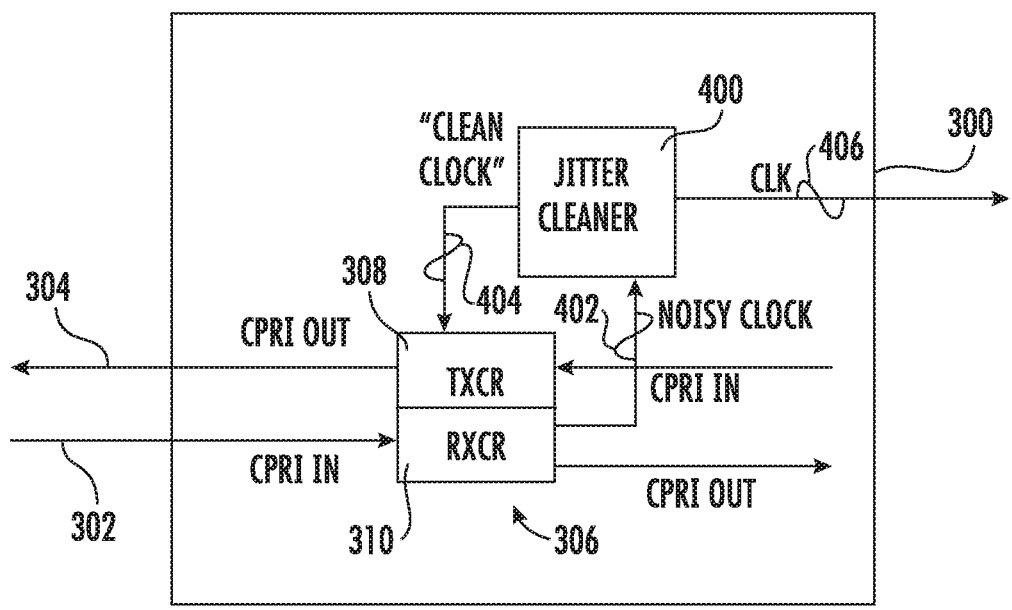
FIG. 4 illustrates a conventional clock cleaning circuit that may be used in the DRU of FIG. 3.

In this regard, FIG. 4 illustrates a conventional generic input 300 with associated CPRI in line 302, CPRI out line 304, and transceiver 306 with a transmitter 308 and a receiver 310. The receiver 310 outputs a noisy clock signal 402 to a jitter cleaner circuit 400, which may be a PLL. The jitter cleaner circuit 400 provides a cleaned clock signal 404 back to the transceiver 306. Thus, the jitter cleaner circuit 400 may also output a cleaned clock signal 406 (CLK (also labeled CC1-CCM in FIG. 3)) that may be used by the transceiver 306 or sent to a remote unit(s). It should be appreciated that when each transceiver 306(1)-306(M) has its own respective jitter cleaner circuit 400, the cost of the central unit 106 is increased. Given that, in many cases, the clock signal is the same because it originates from a single signal provider, such cost is unnecessary.

Exemplary aspects of the present disclosure multiplex clock signals from the same source and only clean one of the duplicative clock signals. Thus, instead of M jitter cleaners, the number of jitter cleaners may be reduced to the number of network operators. The cleaned clock signals may be replicated and sent back to all the relevant transceivers and the communication medium 112.

Figure 5:
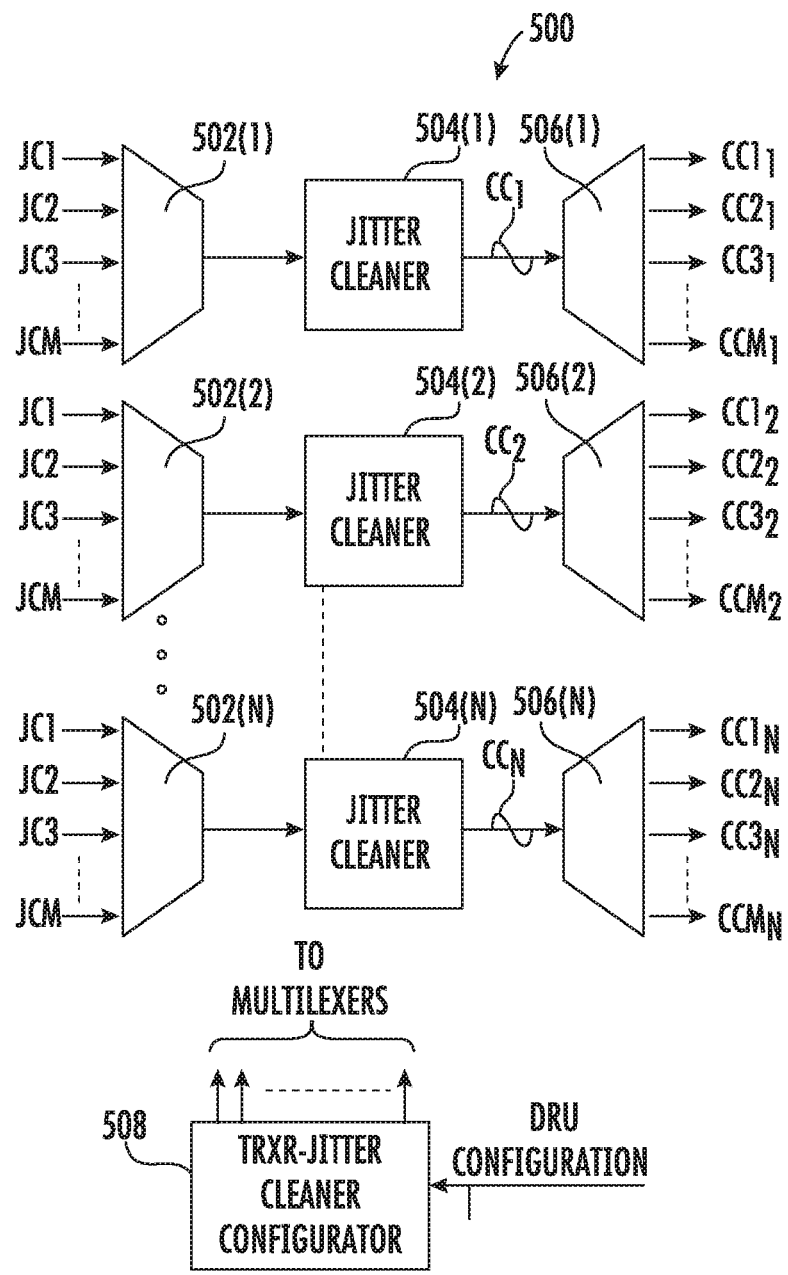
FIG. 5 illustrates a simplified block diagram of a central unit with consolidated jitter cleaners to provide clock signals according to exemplary aspects of the present disclosure.

In this regard, FIG. 5 illustrates a jitter cleaner consolidation circuit 500. The jitter cleaner consolidation circuit 500 includes multiplexers 502(1)-502(N) (generically multiplexer 502), where N corresponds to a number of expected network service providers (e.g., AT&T, T-MOBILE, SPRINT, VERIZON, etc.). Each multiplexer 502(1)-502(N) receives jittery clock signals (labeled JC1-JCM) such as from each of the transceivers 306(1)-306(M) of FIG. 3. Each multiplexer 502(1)-502(N) is coupled to a respective jitter cleaner circuit 504(1)-504(N) that may be structurally the same as the jitter cleaner circuit 400 of FIG. 4. The jitter cleaner circuits 504(1)-504(N) output cleaned clock signals ($CC1$-$CC_N$) to respective routers 506(1)-506(N). Each of the routers 506(1)-506(N) duplicates the respective cleaned clock signals $CC_1$-$CC_N$ and outputs duplicative cleaned clock signals $CC1_1$-$CCM_1$ through $CC1_N$-$CCM_N$, respectively.

With continued reference to FIG. 5, a jitter cleaner configurator circuit 508, which may be a circuit in the control circuit 312 of FIG. 3, may cause an individual multiplexer 502 of the multiplexers 502(1)-502(N) to select one of the jittery clock signals JC1-JCM to be passed to its respective jitter cleaner circuit 504(1)-504(N). Likewise, the jitter cleaner configurator circuit 508 may control the routers 506(1)-506(N) to control to which transceivers 306(1)-306

(M) specific cleaned clock signals are routed. That is, the cleaned clock signal $CC_1$ may be duplicated into certain ones of the cleaned clock signals $CC1_1$-$CCM_1$ and assigned to any first set of outputs of the router 506(1). Likewise, the cleaned clock signal $CC_2$ may be duplicated into certain ones of the cleaned clock signals $CC1_2$-$CCM_2$ and assigned to a second set of outputs. It should be appreciated that the intersection of the first set and the second set is empty (or null) so that there is no contention between two signals being sent to a single receiver (e.g., there would not be both $CC1_1$ and $CC1_2$ going to the first transceiver). The jitter cleaner configurator circuit 508 may operate to prevent such duplicative or overlapping signal assignments. The jitter cleaner configurator circuit 508 also receives information about the configuration of the central unit 106 and specifically receives information indicating which of the inputs 300(1)-300(M) are connected to which network service providers. This information is used to control the clock inputs to the transceivers 306(1)-306(M).

An example may be of assistance. Assume, for the sake of this example, that M is 36 and that there are three (i.e., N=3 in this example) network service providers corresponding to the signal sources 208A-208C of FIG. 2. Further assume that a first subset of inputs 300(1)-300(5) and 300(11) is coupled to signal source 208A; a second subset of inputs 300(6)-300(10) and 300(12)-300(15) is coupled to signal source 208B; and a third subset of inputs 300(16)-300(36) is coupled to signal source 208C. The jittery clock signals JC1-JCM may be provided to each multiplexer 502(1)-502(3). It should be appreciated that the plurality of inputs 300(1)-300(M) may be split into different subsets depending on how many signal sources are coupled to the central unit and to which inputs each signal source is coupled. However, the first multiplexer 502(1) selects only one of the jittery clock signals JC1-JC5 and JC11 to be passed to the jitter cleaner circuit 504(1); the second multiplexer 502(2) selects only one of the jittery clock signals JC6-JC10 and JC12-JC15 to be passed to the jitter cleaner circuit 504(2); and the third multiplexer 502(3) selects only one of the jittery clock signals JC16-JC36 to be passed to the jitter cleaner circuit 504(3). The jitter cleaner circuits 504(1)-504(3) output respective cleaned clock signals which are then duplicated by respective routers 506(1)-506(3). However, the routers 506(1)-506(3) only output cleaned clock signals on the appropriate lines. Thus, the first router 506(1) outputs cleaned clock signals $CC1_1$-$CC5_1$ and $CC11_1$; the second router 506(2) outputs cleaned clock signals $CC6_2$-$CC10_2$ and $CC12_2$-$CC15_2$; and the third router 506(3) outputs cleaned clock signals $CC16_3$-$CC36_3$. The cleaned clock signals are then provided to the respective transceivers 306(1)-306(M). In this manner, instead of M jitter cleaners like in a conventional system, only N jitter cleaners are used. In a typical implementation where M is 36 and N is between three and five, that may be a savings of approximately $500 USD per DRU. That is, each jitter cleaner is about $15 USD, so eliminating thirty-three jitter cleaners would be approximately $495 USD. For different values of M and N, different savings may be realized.

It should be appreciated that the jitter cleaner configurator circuit 508 may have the configuration manually programmed at installation and manually updated as changes are made, or this information may be collected in an automated fashion, where the control circuit queries through each input to the connected signal source to determine which signal source is connected to which input. Still other techniques of providing this information to the jitter cleaner configurator circuit 508 may be implemented without departing from the scope of the present disclosure.

Figure 6:
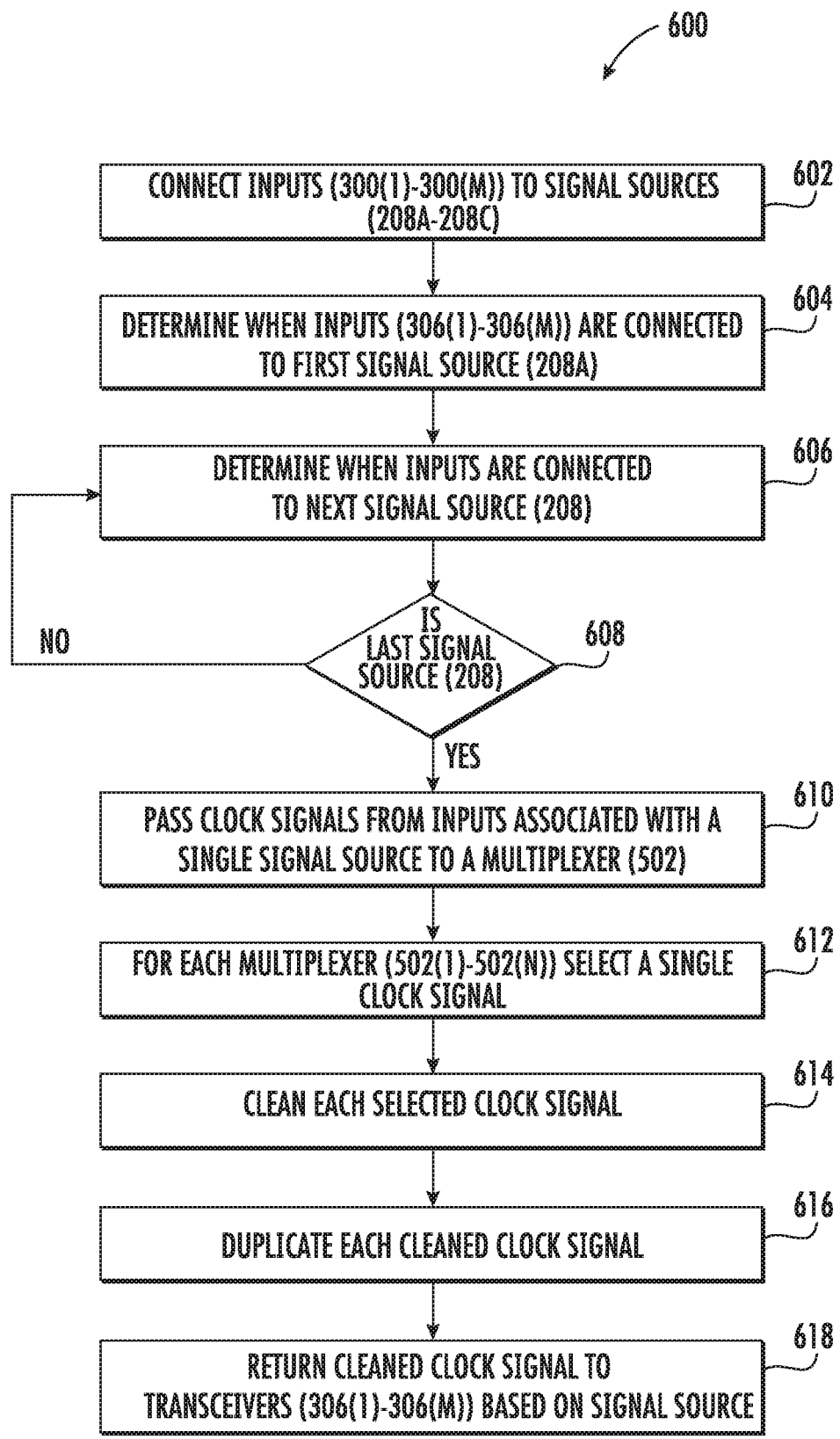
FIG. 6 illustrates a flowchart for the operation of the DRU of FIG. 5.

Against the backdrop of FIGS. 4 and 5, a process 600 for implementing exemplary aspects of the present disclosure is provided with reference to FIG. 6. Specifically, the process 600 begins by connecting inputs (e.g., 300(1)-300(M) or a subset thereof) to signal source(s) (block 602). The control circuit 312 determines which inputs are connected to a first signal source (block 604). The control circuit 312 then determines which inputs are connected to the next signal source (block 606). This information may be mapped through a look-up table or the like in the jitter cleaner configurator circuit 508 or other element in the control circuit 312. The control circuit 312 determines if that was the last signal source (block 608). If the answer to block 608 is no, then the control circuit 312 iterates through the signal sources until the last signal source is mapped to inputs. Once all the inputs are mapped to signal sources (i.e., the answer to block 608 is yes), then the process 600 passes clock signals from inputs associated with a single signal source to a multiplexer (block 610). For each multiplexer, the control circuit 312 selects a single clock signal (block 612). The respective jitter cleaner cleans each selected clock signal (block 614). The cleaned clock signals are passed to respective routers which duplicate each cleaned clock signal (block 616). Then the cleaned clock signals are returned to the transceivers based on the signal source (block 618) and as indicated by the jitter cleaner configurator circuit 508. In practice, the jitter cleaner configurator circuit 508 instructs the routers 506(1)-506(N) onto which outputs cleaned clock signals are duplicated.

In this manner the cleaning of the clock signals is consolidated to relatively few jitter cleaners, eliminating or reducing redundant circuitry at substantial cost savings. Further, as less circuitry is required, the size of the circuit boards for the central unit 106 may be reduced, providing space savings.

Note that the process 600 of FIG. 6 is a non-limiting example and additional steps may occur without departing from the present disclosure. For example, if a clock source that is being used for multiple CPRI ports is lost, the jitter cleaner configurator circuit 508 may cause a second clock to be selected and multiplexed appropriately. In such instance, appropriate circuitry may be added to sense the presence of the clock signal and cause the jitter cleaner configurator circuit 508 to select the clock source dynamically as needed. As another example, the assignment of a given router 506(1)-506(N) may be changed to source its clock from a different JC1-JCM.

Figure 7:
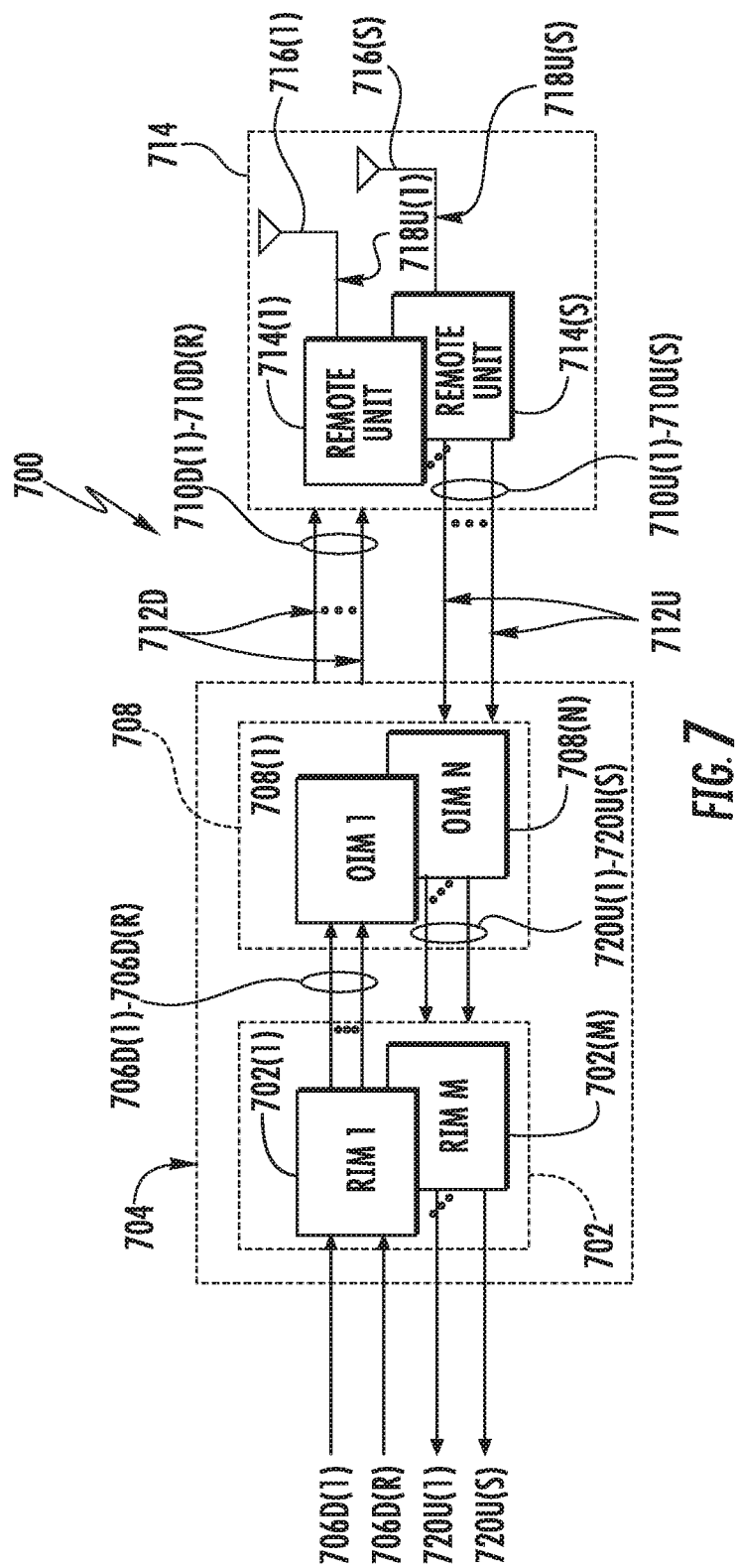
FIG. 7 is a schematic diagram of an exemplary WDS provided in the form of an optical fiber-based WDS that can include a central unit having consolidated jitter cleaners such as the central unit of FIG. 5.

FIG. 7 is a schematic diagram of an exemplary WDS 700 provided in the form of an optical fiber-based WDS that can include a control system having the consolidated jitter cleaners of FIG. 5. The WDS 700 includes an optical fiber for distributing communication services for multiple frequency bands. The WDS 700 in this example is comprised of three (3) main components. A plurality of radio interfaces provided in the form of radio interface modules (RIMs) 702(1)-702(M) are provided in a central unit 704, which may be configured to include the consolidated jitter cleaners. Further, the central unit 704 may receive and process a plurality of downlink communication signals 706D(1)-706D(R) prior to optical conversion into downlink optical fiber-based communication signals. The downlink communication signals 706D(1)-706D(R) may be received from a base station as an example. The RIMs 702(1)-702(M) provide both downlink and uplink interfaces for signal processing. The notations "1-R" and "1-M" indicate that any number of the referenced component, 1-R and 1-M, respectively, may be provided. The central unit 704 is configured to accept the RIMs 702(1)-702(M) as modular components that can easily be installed and removed or replaced in the central unit 704. In one example, the central unit 704 is configured to support up to twelve (12) RIMs 702(1)-702(12). Each of the RIMs 702(1)-702(M) can be designed to support a particular type of radio source or range of radio sources (i.e., frequencies) to provide flexibility in configuring the central unit 704 and the WDS 700 to support the desired radio sources.

For example, one RIM 702 may be configured to support the Personalized Communications System (PCS) radio band. Another RIM 702 may be configured to support the 800 megahertz (MHz) radio band. In this example, by inclusion of the RIMs 702(1)-702(M), the central unit 704 could be configured to support and distribute communication signals on both PCS and Long-Term Evolution (LTE) 700 radio bands, as an example. The RIMs 702(1)-702(M) may be provided in the central unit 704 that support any frequency bands desired, including, but not limited to, the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 702(1)-702(M) may also be provided in the central unit 704 that support any wireless technologies desired, including, but not limited to, Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 702(1)-702(M) may be provided in the central unit 704 that support any frequencies desired, including, but not limited to, US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 7, the downlink communication signals 706D(1)-706D(R) are provided to a plurality of optical interfaces provided in the form of optical interface modules (OIMs) 708(1)-708(N) in this embodiment to convert the downlink communication signals 706D(1)-706D(R) into a plurality of downlink optical fiber-based communication signals 710D(1)-710D(R). The notation "1-N" indicates that any number of the referenced component 1-N may be provided. The OIMs 708(1)-708(N) may be configured to provide a plurality of optical interface components (OICs) that contain optical-to-electrical (O/E) and E/O converters, as will be described in more detail below. The OIMs 708(1)-708(N) support the radio bands that can be provided by the RIMs 702(1)-702(M), including the examples previously described above.

The OIMs 708(1)-708(N) each include E/O converters to convert the downlink communication signals 706D(1)-706D (R) into the downlink optical fiber-based communication signals 710D(1)-710D(R). The downlink optical fiber-based communication signals 710D(1)-710D(R) are communicated over a downlink optical fiber-based communication medium 712D to a plurality of remote units 714(1)-714(S). The notation "1-S" indicates that any number of the referenced component 1-S may be provided. Remote unit O/E converters provided in the remote units 714(1)-714(S) convert the downlink optical fiber-based communication signals 710D(1)-710D(R) back into the downlink communication signals 706D(1)-706D(R), which are then converted into a plurality of downlink RF communication signals and provided to antennas 716(1)-716(S) in the remote units 714(1)-714(S) to client devices in the reception range of the antennas 716(1)-716(S).

The remote units 714(1)-714(S) receive a plurality of uplink RF communication signals from the client devices through the antennas 716(1)-716(S). The remote units 714 (1)-714(S) convert the uplink RF communication signals into a plurality of uplink communication signals 718U(1)-718U(S). Remote unit E/O converters are also provided in the remote units 714(1)-714(S) to convert the uplink communication signals 718U(1)-718U(S) into a plurality of uplink optical fiber-based communication signals 710U(1)-710U(S). The remote units 714(1)-714(S) communicate the uplink optical fiber-based communication signals 710U(1)-710U(S) over an uplink optical fiber-based communication medium 712U to the OIMs 708(1)-708(N) in the central unit 704. The OIMs 708(1)-708(N) include O/E converters that convert the received uplink optical fiber-based communication signals 710U(1)-710U(S) into a plurality of uplink communication signals 720U(1)-720U(S), which are processed by the RIMs 702(1)-702(M) and provided as the uplink communication signals 720U(1)-720U(S). The central unit 704 may provide the uplink communication signals 720U(1)-720U(S) to a base station or other communication system.

Note that the downlink optical fiber-based communication medium 712D and the uplink optical fiber-based communication medium 712U connected to each of the remote units 714(1)-714(S) may be a common optical fiber-based communication medium, wherein for example, wave division multiplexing (WDM) is employed to provide the downlink optical fiber-based communication signals 710D(1)-710D(R) and the uplink optical fiber-based communication signals 710U(1)-710U(S) on the same optical fiber-based communication medium.

Figure 8:
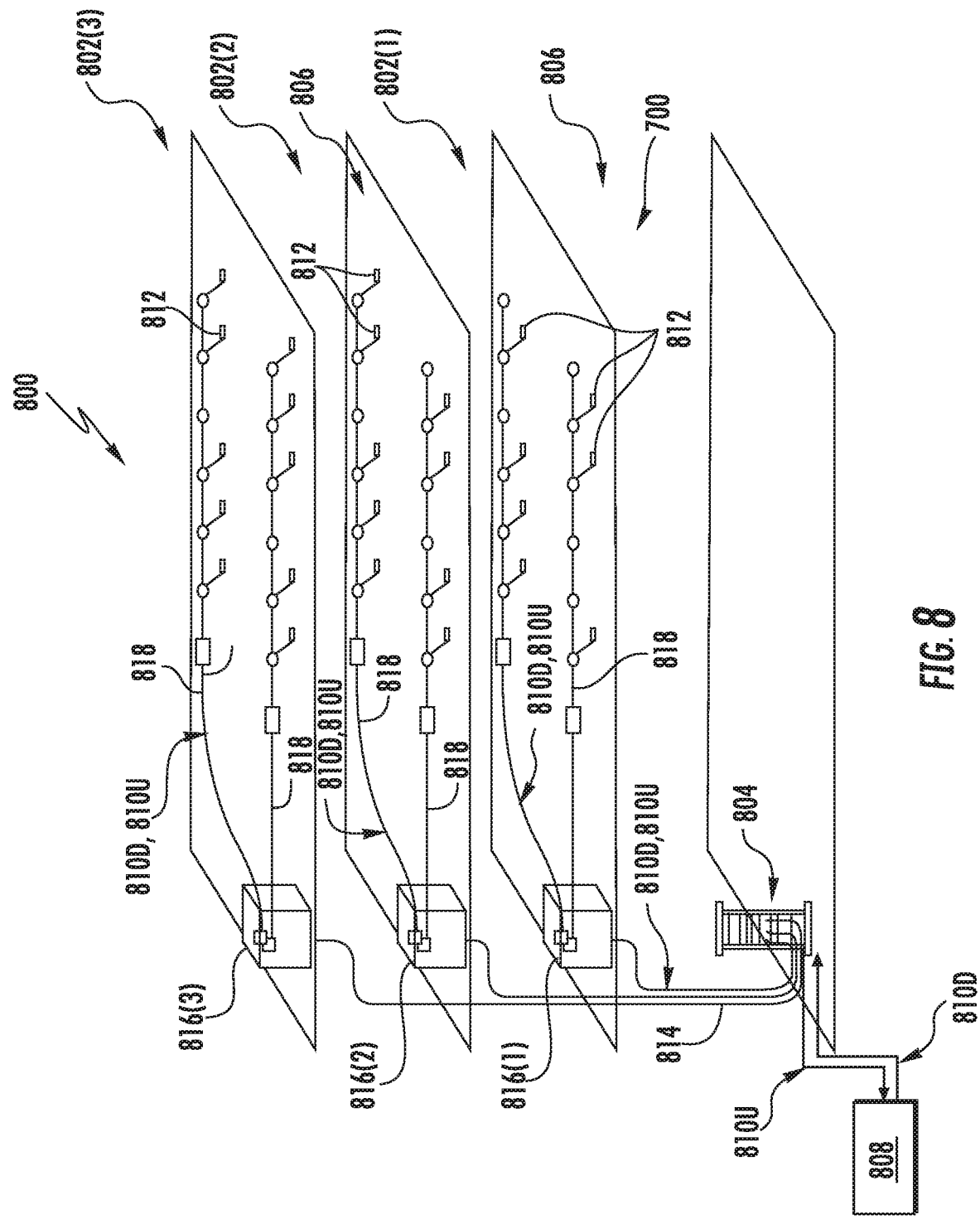
FIG. 8 is a partial schematic cut-away diagram of an exemplary building infrastructure in which a WDS, such as the WDS of FIG. 7, can include a central unit having consolidated jitter cleaners such as the central unit of FIG. 5.

The WDS 700 of FIG. 7 may be provided in an indoor environment, as illustrated in FIG. 8. FIG. 8 is a partial schematic cut-away diagram of an exemplary building infrastructure 800 in which a WDS, such as the WDS 700 of FIG. 7, can include consolidated jitter cleaners according to exemplary aspects of the present disclosure. The building infrastructure 800 in this embodiment includes a first (ground) floor 802(1), a second floor 802(2), and a third floor 802(3). The floors 802(1)-802(3) are serviced by a central unit 804 to provide antenna coverage cells 806 in the building infrastructure 800. The central unit 804 is communicatively coupled to a base station 808 to receive downlink communication signals 810D from the base station 808. The central unit 804 is communicatively coupled to a plurality of remote units 812 to distribute the downlink communication signals 810D to the remote units 812 and to receive uplink communication signals 810U from the remote units 812, as previously discussed above. The downlink communication signals 810D and the uplink communication signals 810U communicated between the central unit 804 and the remote units 812 are carried over a riser cable 814. The riser cable 814 may be routed through interconnect units (ICUs) 816(1)-816(3) dedicated to each of the floors 802(1)-802(3) that route the downlink communication signals 810D and the uplink communication signals 810U to the remote units 812 and also provide power to the remote units 812 via array cables 818.

Figure 9:
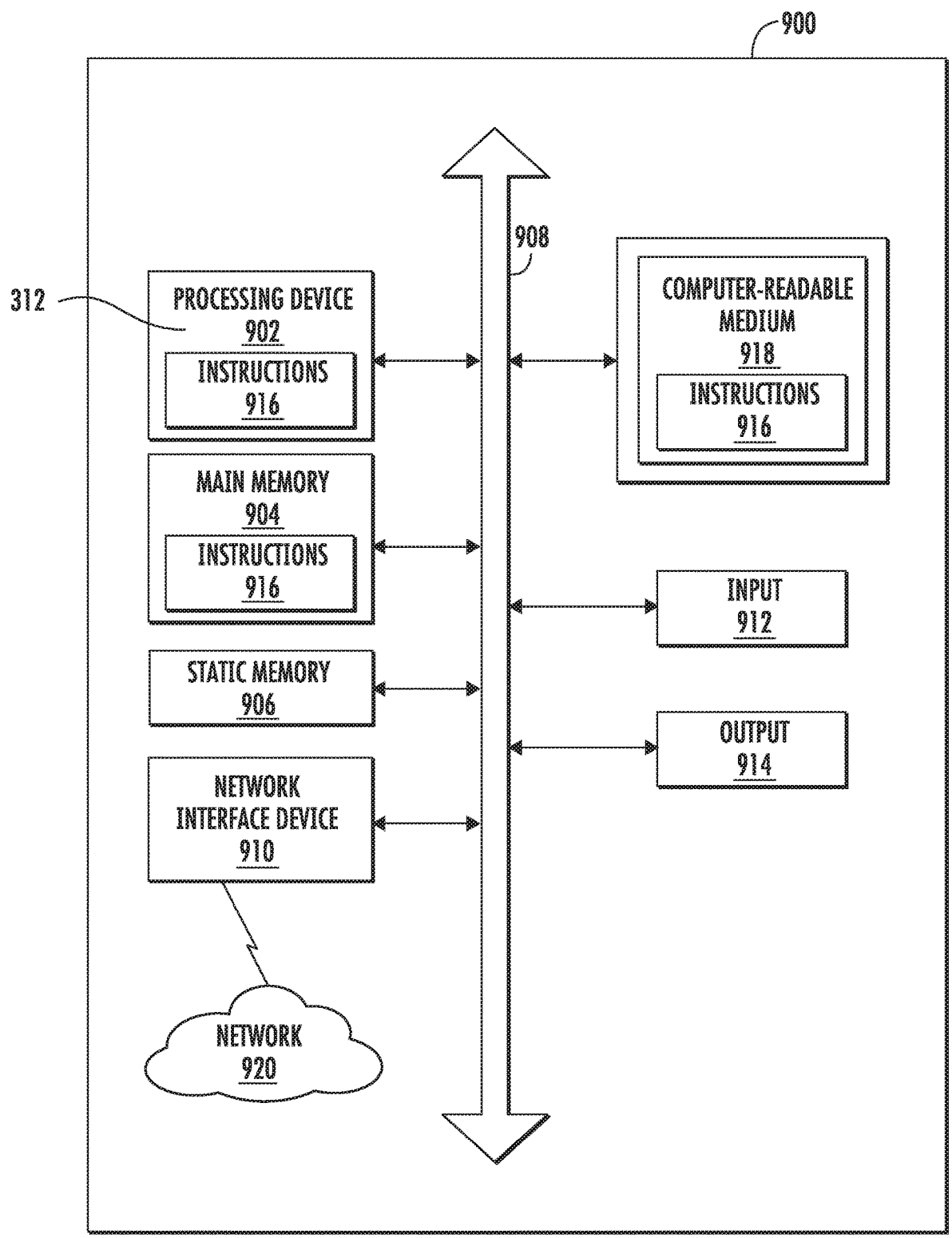
FIG. 9 is a schematic diagram representation of additional detail illustrating an exemplary computer system that could be employed in a controller, such as a central unit having consolidated jitter cleaners.

FIG. 9 is a schematic diagram representation of additional detail illustrating an exemplary computer system 900 that could be employed in a controller that controls operation of the multiplexers and routers used with the consolidated jitter cleaners. In this regard, the computer system 900 is adapted to execute instructions from an exemplary computer-readable medium to perform these and/or any of the functions or processing described herein.

In this regard, the computer system 900 in FIG. 9 may include a set of instructions that may be executed to predict frequency interference to avoid or reduce interference in a multi-frequency distributed antenna system (DAS). The computer system 900 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 900 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 900 in this embodiment includes a processing circuit or processor 902, a main memory 904 (e.g., read-only memory (ROM), flash memory, dynamic random access memory (DRAM), such as synchronous DRAM (SDRAM), etc.), and a static memory 906 (e.g., flash memory, static random access memory (SRAM), etc.), which may communicate with each other via a data bus 908. Alternatively, the processor 902 may be connected to the main memory 904 and/or the static memory 906 directly or via some other connectivity means. The processor 902 may be a controller, and the main memory 904 or the static memory 906 may be any type of memory.

The processor 902 represents one or more general-purpose processing devices, such as a microprocessor, CPU, or the like. More particularly, the processor 902 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 902 is configured to execute processing logic in instructions for performing the operations and steps discussed herein. In a non-limiting example, the processor 902 can be configured to function as the control circuit 312 of FIG. 3 or the jitter cleaner configurator circuit 508 of FIG. 5.

The computer system 900 may further include a network interface device 910. The computer system 900 also may or may not include an input 912, configured to receive input and selections to be communicated to the computer system 900 when executing instructions. The computer system 900 also may or may not include an output 914, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 900 may or may not include a data storage device that includes instructions 916 stored in a computer-readable medium 918. The instructions 916 may also reside, completely or at least partially, within the main memory 904 and/or within the processor 902 during execution thereof by the computer system 900, the main memory 904 and the processor 902 also constituting a computer-readable medium. The instructions 916 may further be transmitted or received over a network 920 via the network interface device 910.

While the computer-readable medium 918 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical media, and magnetic media.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., read only memory (ROM), random access memory (RAM), a magnetic disk storage medium, an optical storage medium, flash memory devices, etc.), and the like.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A central unit in a wireless distribution system (WDS), the central unit comprising:
 a plurality of inputs, comprising:
  a first subset of inputs configured to be coupled to a first signal source using a common public radio interface (CPRI) protocol;
 a first multiplexer coupled to the plurality of inputs and configured to:
  receive first jittery clock signals from each of the first subset of inputs;
  select a first one of the first jittery clock signals; and
  output the first one of the first jittery clock signals;
 a first jitter cleaner circuit coupled to the first multiplexer and configured to:
  receive the first one of the first jittery clock signals; and
  produce a first cleaned clock signal;
 at least a second subset of inputs configured to be coupled to a second signal source using the CPRI protocol;
 a second multiplexer coupled to the plurality of inputs and configured to:
  receive second jittery clock signals from each of the second subset of inputs;
  select a second one of the second jittery clock signals; and
  output the second one of the second jittery clock signals; and
 a second jitter cleaner circuit coupled to the second multiplexer and configured to:
  receive the second one of the jittery clock signals; and
  produce a second cleaned clock signal.

2. The central unit of claim 1, further comprising a first router coupled to the first jitter cleaner circuit, the first router configured to duplicate the first cleaned clock signal.

3. The central unit of claim 2, wherein the first router provides the first cleaned clock signal to each of the first subset of inputs.

4. The central unit of claim 1, wherein each of the plurality of inputs comprises a respective transceiver.

5. The central unit of claim 1, wherein the first signal source comprises a baseband unit (BBU).

6. The central unit of claim 1, further comprising a jitter cleaner configurator circuit configured to control the first multiplexer.

7. The central unit of claim 1, wherein the first multiplexer is also coupled to inputs within the plurality of inputs other than the first subset of inputs.

8. A wireless distribution system (WDS), comprising:
 a plurality of remote units;
 a central unit, the central unit coupled to the plurality of remote units via a plurality of communication media, respectively, the central unit comprising:
  a plurality of inputs, comprising:
   a first subset of inputs configured to be coupled to a first signal source using a common public radio interface (CPRI) protocol;
  a first multiplexer coupled to the plurality inputs and configured to:
   receive first jittery clock signals from each of the first subset of inputs;
   select a first one of the first jittery clock signals; and
   output the first one of the first jittery clock signals;
  a first jitter cleaner circuit coupled to the first multiplexer and configured to:
   receive the first one of the first jittery clock signals; and
   produce a first cleaned clock signal;
  at least a second subset of inputs configured to be coupled to a second signal source using the CPRI protocol;
  a second multiplexer coupled to the plurality of inputs and configured to:
   receive second jittery clock signals from each of the second subset of inputs;
   select a second one of the second jittery clock signals; and
   output the second one of the second jittery clock signals; and
  a second jitter cleaner circuit coupled to the second multiplexer and configured to:
   receive the second one of the jittery clock signals; and
   produce a second cleaned clock signal; and
  the central unit configured to:
   distribute a plurality of downlink communication signals to the plurality of remote units via the plurality of communication media, respectively;
   receive a plurality of uplink communication signals from the plurality of remote units via the plurality of communication media, respectively; and
   generate a plurality of communication signals based on the plurality of uplink communication signals, wherein each of the plurality of communication signals corresponds to a signal channel and a remote unit among the plurality of remote units communicating on the signal channel; and
 a signal processing circuit comprising a signal input communicatively coupled to a plurality of signal sources, respectively.

9. A method for managing clock signals in a central unit, the method comprising:
 receiving a plurality of common public radio interface (CPRI) protocol signals at a first subset of inputs among a plurality of inputs at the central unit;
 passing jittery clock signals from the first subset of inputs to a first multiplexer;
 selecting one of the jittery clock signals at the first multiplexer;
 cleaning the selected one of the jittery clock signals with a jitter cleaner circuit to produce a cleaned clock signal
 receiving a second plurality of CPRI protocol signals at a second subset of inputs among the plurality of inputs at the central unit;
 receiving at a second multiplexer second jittery clock signals from each of the second subset of inputs;
 selecting a second one of the second jittery clock signals;
 outputting the second one of the second jittery clock signals;
 receiving, at a second jitter cleaner circuit, the second one of the second jittery clock signals; and
 producing a second cleaned clock signal.

10. The method of claim 9, further comprising duplicating the cleaned clock signal with a router.

11. The method of claim 10, further comprising providing the cleaned clock signal to each of the first subset of inputs.

12. The method of claim 9, wherein receiving the plurality of CPRI protocol signals comprises receiving the plurality of CPRI protocol signals from a baseband unit (BBU).

13. The method of claim 9, further comprising storing mapping information about which of the plurality of inputs are in the first subset of inputs.

14. The method of claim 13, wherein storing the mapping information comprises storing the mapping information in a jitter cleaner configurator circuit.

* * * * *